United States Patent [19]
Beatenbough

[11] Patent Number: 5,778,689
[45] Date of Patent: Jul. 14, 1998

[54] SYSTEM FOR MAINTAINING REFRIGERATION DOORS FREE OF FROST AND CONDENSATION

[76] Inventor: Bryan Beatenbough, 508 Bowers St., Royston, Ga. 30662

[21] Appl. No.: 858,526

[22] Filed: May 19, 1997

[51] Int. Cl.[6] .................................................. H05B 3/84
[52] U.S. Cl. ........................... 62/150; 62/248; 219/218
[58] Field of Search ............................. 62/150, 248, 273, 62/275, 176.2, 176.6, 151; 219/203, 218, 522

[56] References Cited

U.S. PATENT DOCUMENTS

| | | | |
|---|---|---|---|
| 3,443,395 | 5/1969 | Schweiger | 62/275 X |
| 3,859,502 | 1/1975 | Heaney | 219/218 |
| 3,911,245 | 10/1975 | O'Shaughnessy | 62/150 X |
| 3,939,666 | 2/1976 | Bashark | 62/150 |
| 4,052,691 | 10/1977 | Nagano et al. | 338/35 |
| 4,127,765 | 11/1978 | Heaney | 62/150 X |
| 4,192,149 | 3/1980 | Webb | 62/273 X |
| 4,260,876 | 4/1981 | Hochheiser | 219/218 X |
| 4,261,179 | 4/1981 | Dageford | 62/150 |
| 4,862,701 | 9/1989 | Small et al. | 62/150 |
| 5,449,885 | 9/1995 | Vandecastele | 219/522 |

*Primary Examiner*—Harry B. Tanner
*Attorney, Agent, or Firm*—Henry S. Jaudon; Cort Flint

[57] ABSTRACT

An energy conservation device, for use with display type refrigeration and freezer units having glass display doors for preventing the formation of condensation and frost on the glass of the doors. The device comprises heating elements arranged with portions of the doors which act to maintain the doors within a desired temperature range. A control is connected with the heating elements and with an electrical power source. The control includes a monitor for monitoring room temperature and relative humidity and includes a processor for converting same into degrees dew point. A pulse activator is connected with the heating elements for delivering an electrical pulse having a determined active width. The processor continuously accesses the dew point and continuously determines the active width of the electrical pulses necessary to maintain the doors within the desired temperature range. The processor delivers the electrical pulses having determined active widths to the pulse activator for delivery to the heating elements. By controlling the active width of each electrical pulse a minimum of electrical energy is consumed in maintaining the glass doors free of condensation and frost.

10 Claims, 2 Drawing Sheets

5,778,689

1
SYSTEM FOR MAINTAINING REFRIGERATION DOORS FREE OF FROST AND CONDENSATION

BACKGROUND OF THE INVENTION

This invention relates to a system for maintaining glass doors of refrigeration/freezer units free of condensation and frost while maximizing the conservation of electrical energy.

It has long been the practice, where there is a need for maintaining the glass doors of refrigeration/freezer units arranged in convenience stores and supermarkets free of frost and condensation, to heat the doors using sequenced electrical pulses which are delivered in accordance with the sensed temperature or relative humidity of the room. Such sensings are not particularly accurate in determining the percent of run time required for the frost and condensation removing device. As a result large amounts of energy are wastefully consumed i.e., up to $4000 per year for an average sized room or store area. Certain of the known devices are illustrated and described in U.S. Pat. Nos. 3,859,502; 3,911,245; 4,052,619; 4,127,765; 4,260,876; 4,862,701; and 5,449,885.

The instant invention has as an objective to provide a device which continuously monitors the room temperature and humidity and calculates from these sensings the dew point. The dew point is then use to control the time periods of electrical consumption to a minimum.

Another objective of the invention is to provide ever changing data to determine the active width of each pulse time for the device.

Another object of the invention is to provide a stand-alone device which controls refrigeration/freezer door temperature independent of other room temperature control devices.

Another objective of the invention is to provide a solid state control unit.

Another object of the invention is to provide a door temperature control device which produces immediate monetary benefits.

Another object of the invention is to provide a control unit for maintaining the glass doors of refrigeration/freezer units free of condensation and frost at a substantial savings over conventional units.

SUMMARY OF THE INVENTION

The above objectives are accomplished according to the present invention by providing a control device for use with display type refrigeration/freezer equipment having glass display doors and arranged within the room area of a store. The device operates to minimize the amount of electrical power used to prevent the formation of condensation and frost on the glass while the equipment is in use. The device includes heating elements arranged with portions of the doors which act to maintain the glass within a desired temperature range. The control device is connected with the heating elements and with an electrical power source. The control device includes monitors for continuously monitoring room temperature and relative humidity and a control panel having a processor for converting the temperature and humidity into degrees dew point. The control panel includes a pulse activator connected with the heating elements and which is operative to deliver electrical pulses of preset duration and a variable active width to the heating elements for maintaining the glass of the doors within a desired temperature range.

The processor continuously monitors the dew point and continually determines the active width of each electrical pulse in response to the computed dew point degree which is necessary to maintain the glass of the doors within the desired temperature range.

The control includes adjustable limits setting maximum and minimum active widths and setting maximum and minimum dew point active ranges.

The pulse activator includes a plurality solid state relays. Each of the relays is connected with the plurality of doors of an individual refrigeration/freezer unit.

The device is a solid state stand-alone unit which is not dependent upon any other temperature controls within the store. It is designed to optimize the amount of electrical energy used to maintain the glass of the doors of the refrigeration units clear of frost and condensation.

The invention includes a method of optimizing electrical energy usage while maintaining glass doors of display refrigeration/freezer equipment, located in a display area of a store, free of condemnation and frost. The method includes the steps;

- of providing heating elements within at least a portion of each door;
- of providing a temperature and a humidity sensor and sensing the temperature and humidity within the store;
- of providing a control panel, connecting the control panel with the sensors and the heating elements and converting the temperature and humidity sensings into dew point degrees;
- of formulating electrical pulses with variable active widths in response to the calculated dew point and delivering these electrical pulses to the heating elements.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
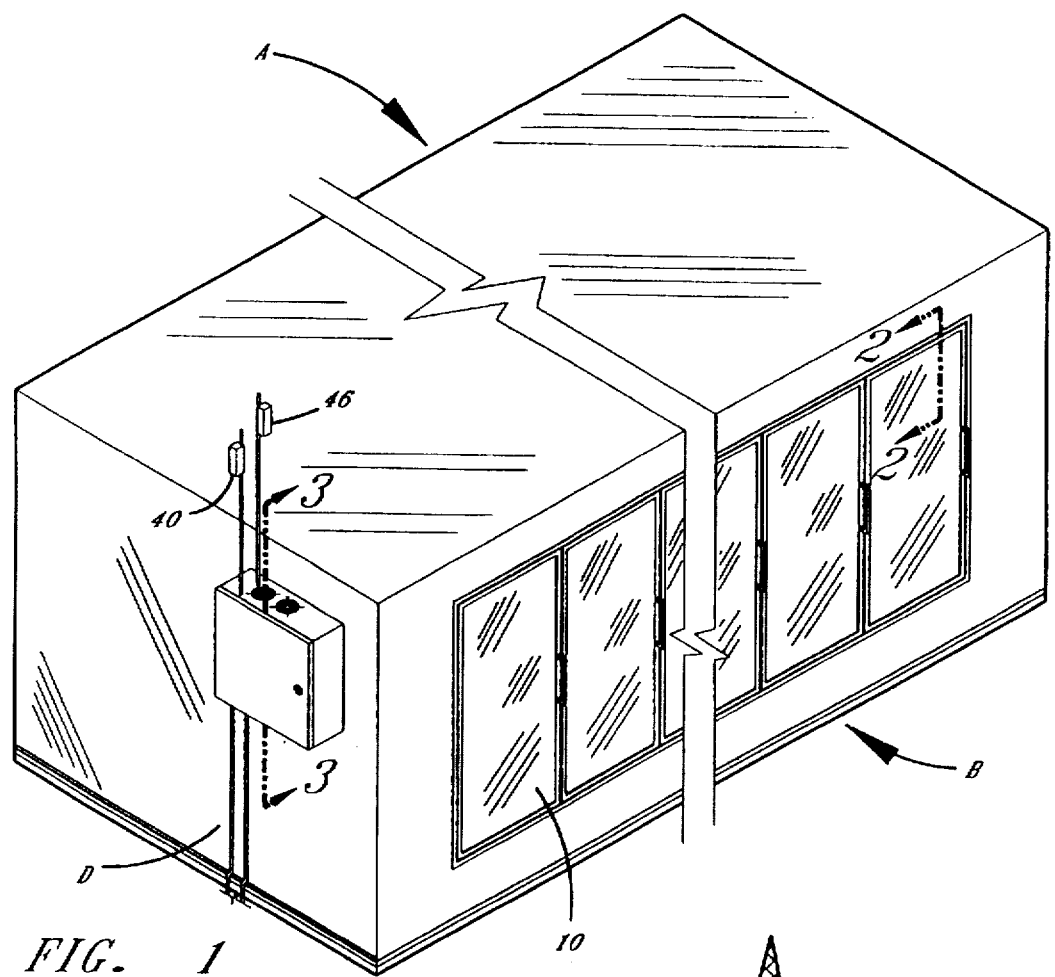
FIG. 1 perspective view of a refrigeration/freezer unit to which the invention is adapted.

Referring now to the drawings, FIG. 1 shows the environment in which the control device of the invention functions. A single refrigeration/freezer unit (A) having a bank of individual doors (B) is shown mounting control device (C) with one side thereof. Control device (C) is supplied with electrical power through line (D) and operates as an independent, stand-alone unit free of direction from any other temperature control associated with the room or store area in which unit (A) operates. The number of doors (B) is limited only by the size of unit (A).

Figure 2:
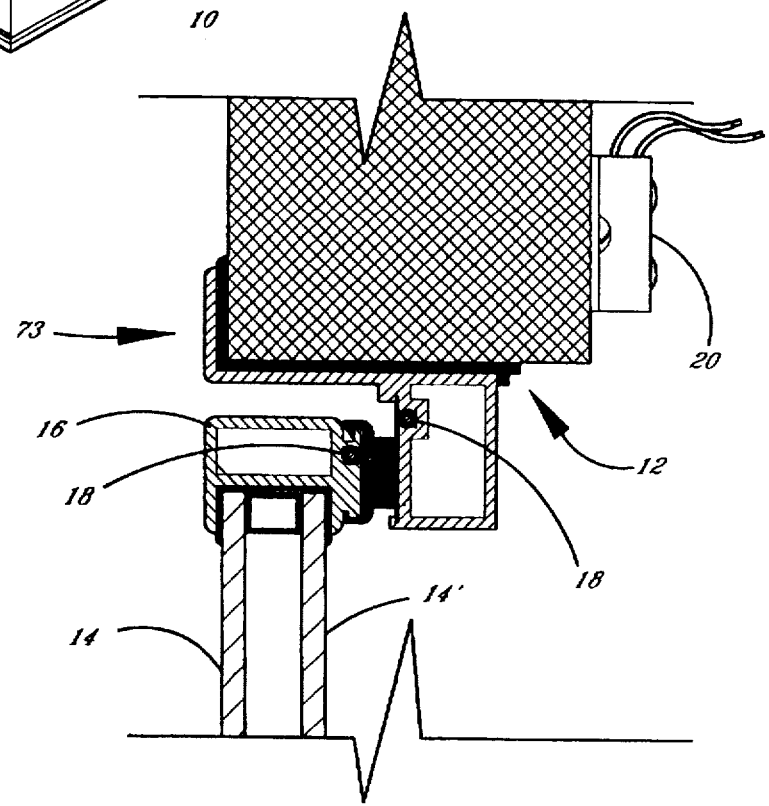
FIG. 2 is a sectional cutaway along lines 2—2 of FIG. 1 of the heating elements within the door.

Turning now to FIG. 2, there is shown a section of a door of the bank of doors (B) and a standard arrangement for providing heat with at least a portion of each door to control against the formation of condensation and frost on the glass. Refrigeration/freezer door 10 is supported in metal door jam 12 and includes a glass area usually consisting of two glass panes 14, 14' mounted in metal frame 16. Door jam 12 and door frame 16 are provided with a plurality of resistance wires 18. One of the glass panes, preferably pane 14', is coated with a very thin transparent electrically conductive layer for heating the surface of the glass. Relay 20, which connects with control device C, provides electrical energy for heating resistant wires 18 and the coating at 14' which in turn heat the doors preventing the formation of condensation and frost. This type of heating arrangement is well known and in itself forms no part of the present invention. The arrangement shown is only representative and could easily be substituted for with other known arrangements.

Figure 3:
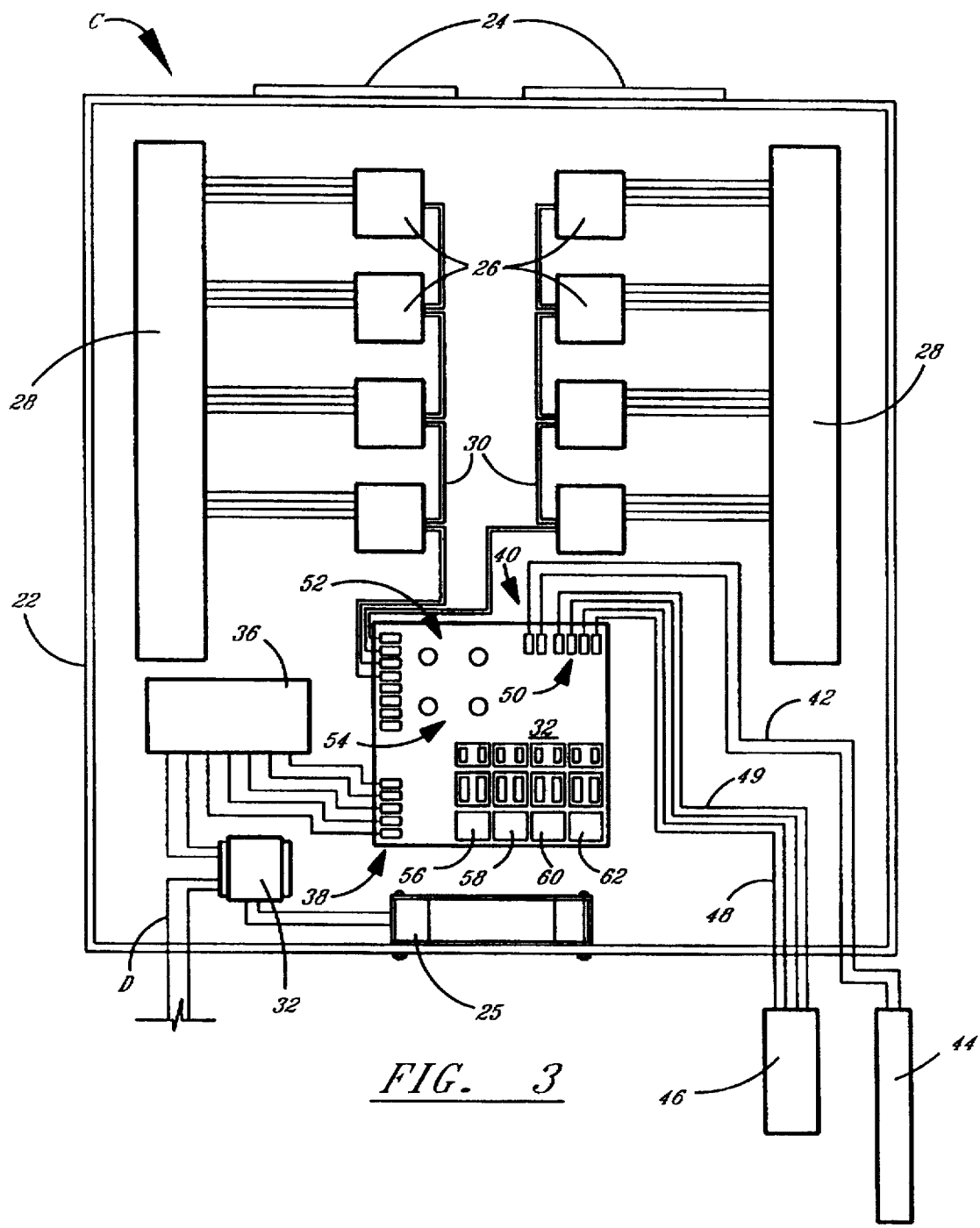
FIG. 3 is diagrammatic view of the control panel.

Turning now to FIG. 3, a schematic of control device C is shown. The mounting cabinet 22 is provided with vents 24 mounted in its upper surface. An exhaust fan 25 is mounted opposite vents 24 and operates to provide air circulation through cabinet 22 which prevents over heating.

A plurality of solid state relays 26 are shown connecting with panels 28 which provide a plurality of connections for connecting with individual units A similar to that shown in FIG. 1. Here it is pointed out that each relay 26 connects with a single unit A and supplies the electrical power for all of the doors B of that unit. Leads 30 connect relays 26 with a solid state control panel 32. Electrical power is delivered through supply line D to an in-line fuse 32'. From fuse 32', power is delivered at 110 V to exhaust fan 25 and to transformed 36. The transformer, which connects with control panel 32 via terminals 38 converts the 110 V's from supply line D into approximately 24 V's which is sufficient to operate the control panel.

Temperature sensing element 44 is mounted centrally of the refrigeration unit A and is connected with control panel C. Element 44 is a resistor type temperature sensing unit and is supplied with power through leads 42 which are connected with terminals 40. The temperature sensing is produced in response to the resistance of sensing unit 40 and is delivered to control panel 32.

Humidity sensing element 46 is also mounted centrally of the refrigeration unit A and is interconnected with control panel 32 by power input lines 48 and dissemination lines 49. In operation sensing element 46 is powered through lines 48 to sense and determine the humidity. The determined reading is delivered to control panel 32 through lines 49 and terminals 50.

Both temperature sensing unit 40 and humidity sensing unit 46 are commercially available and are sold through Alpha Technology and General Eastern, Anderson, S.C.

The temperature and humidity determinations are supplied to control panel 32 which utilizes them to compute the dew point. Control panel 32 is provided with a pair of rotary dials 52 which provide an adjustment for the selection of limits of duration of the pulse time while rotary dials 54 set the maximum and minimum dew point levels.

Control panel 32 is designed to deliver pulses of one second duration. Panel 32 further controls that portion of each pulse or the percent of time in which each pulse is active or hot. This active or hot portion may be referred to as the active width or width of the pulse. The active width of the pulse, which cannot exceed 90% of its total width, is controlled by the dew point of the room in combination with the settings provided by dial sets 52,54.

Dials 52 are designed to control the duration limits of the active pulse. For example, the right dial may set the maximum limit of duration of the active width at 80% while the switch on the left may set the minimum limit of duration of the active width at 20%. The pulse is now controlled to have an active width of no more than 80% of its one second duration and a minimum active width of 20% even when the actual dew point degrees are beyond these limits in either direction.

Dials 54 are designed to set the maximum and minimum dew point levels which are observed and as a result are responded to. For example, the right dial may set the degree dew point at which the active width of the pulse is its maximum while the left dial may set the degree dew point at which the active width of the pulse is minimum.

Normally, it is desired that glass 14, 14' of doors 10 be kept at no less than 2° above the dew point. This would be an optimum condition in which control C would normally act to provide an active pulse width of 0.5 seconds or 50% of the pulse cycle.

The desired duration limits are set as earlier described at desired limits with dials 52 and the maximum and minimum dew point levels are set with dials 54. The device is now operational.

An example would be to provide dew point limit settings of between 60° and 20° dew point. This would result in a maximum active pulse width when the dew point is at 60° or above and a minimum active pulse width when the dew point is at 20° or less. These durations of active pulse widths vary as indicated by the dew point degree within the limits set with dials 52. For example, the maximum duration may be set at 80% of a one second cycle while the minimum may be set at 20% of the cycle. This results in the active width or duration being limited to 80% of the cycle regardless of the degree dew point computed and likewise the minimum duration of the active width is never less than 20% of the cycle. At a dew point between 60° and 20° the active width of the cycle is controlled to be the appropriate width in direct response to the actual dew point computed. In this manner, the electrical energy consumption is maintained at the absolute minimum required to maintain the temperature of the glass doors of the refrigeration units free of frost and condensation.

In operation, the humidity and temperature of the room is determined by sensors 40 and 46 and are furnished to control panel 32. The control panel 32, using the temperature and humidity readings, computes the dew point. Utilizing the setting selected with dials 52 and 54, the active width of each pulse is controlled to maintain the desired conditions in a most efficient manner.

Control panel 32 is provided with four display units identified at 56, 58, 50 and 62. Display 56 is a relative humidity display. Display 58 is a temperature display denoting the room temperature. Display 60 denotes the dew point or the number of degrees above or below the dew point held by doors B. Display 62 represents the percent of time in which the relays 26 are not activated. Display units 56, 58, 60 and 62 provide visual means by which the operator can determine the condition of the room environment and the operating sequence of the condensation and frost preventing device allowing for immediate adjustment when necessary.

While a preferred embodiment of the invention has been described using specific terms, such description is for illustrative purposes only, and it is to be understood that changes and variations may be made without departing from the spirit or scope of the following claims.

What is claimed is:

1. An energy conservation device for use with display type refrigeration and freezer equipment having glass display doors for preventing the formation of condensation and frost on said glass, said device comprising:

a power source;

heating elements arranged with portions of said doors, said heating elements acting to maintain said doors within a desired temperature range;

a control connected with said heating elements and an electrical power source, said control including;

monitors for monitoring room temperature and relative humidity, said monitors being operative to convert said monitored temperature and humidity, into dew point degrees;

a pulse activator connected with said heating elements for delivery of electrical pulses of preselected duration and a controlled active width to said heating elements for maintaining said doors within said desired temperature range;

a processor inter-connecting said monitor and said pulse activator, said processor continuously accessing said dew point and continuously determining the active width of said electrical pulses necessary to maintain said doors within said desired temperature range, said processor continuously delivering said electrical pulses to said pulse activator for delivery to said heating elements; whereby a minimum of electrical energy is required for maintaining said glass doors free of condensation and frost.

2. The device of claim 1 wherein said control includes a digital display for room temperature, relative humidity, dew point and percent of pulse width.

3. The device of claim 1 wherein said control is of solid state construction.

4. The device of claim 1 wherein said control includes adjustable limit settings controlling minimum and maximum active widths of said electrical pulses.

5. The device of claim 1 wherein said pulse activator includes a plurality solid state relays.

6. The device of claim 5 wherein said display doors are arranged in banks and a single of said relays connects with a said bank of doors.

7. The device of claim 1 wherein said control includes adjustable limit setting controlling said active width of said electrical pulses between maximum and minimum dew point degree settings.

8. The device of claim 1 wherein said processor controls said active width of said electrical pulses between duration limits and between dew point degree limits.

9. The device of claim 1 wherein said conservation device is an independent unit.

10. A method of optimizing electrical power usage in maintaining glass doors of display refrigeration and freezer equipment free of condensation and frost within the confines of a room comprising:

providing heating elements within at least a portion of each door;

providing temperature and humidity sensors and sensing the temperature and humidity within said room;

providing a control and connecting said control with said sensors and said heating elements;

continuously delivering said sensed temperature and humidity to said control;

causing said control to continuously compute a dew point from said sensings;

causing said control to continuously process from said dew point sensings electrical pulses of selected duration having variable widths of active pulse time, the length of said active widths being determined by the computed dew point degree and delivering said electrical pulses to said heating elements; whereby, said active widths of said pulses are sufficient to maintain said glass doors only at a temperature necessary to maintain the glass clear of frost and condensation.

* * * * *